May 19, 1942.  J. B. NEALEY  2,283,567
WELDING TORCH
Filed June 25, 1940
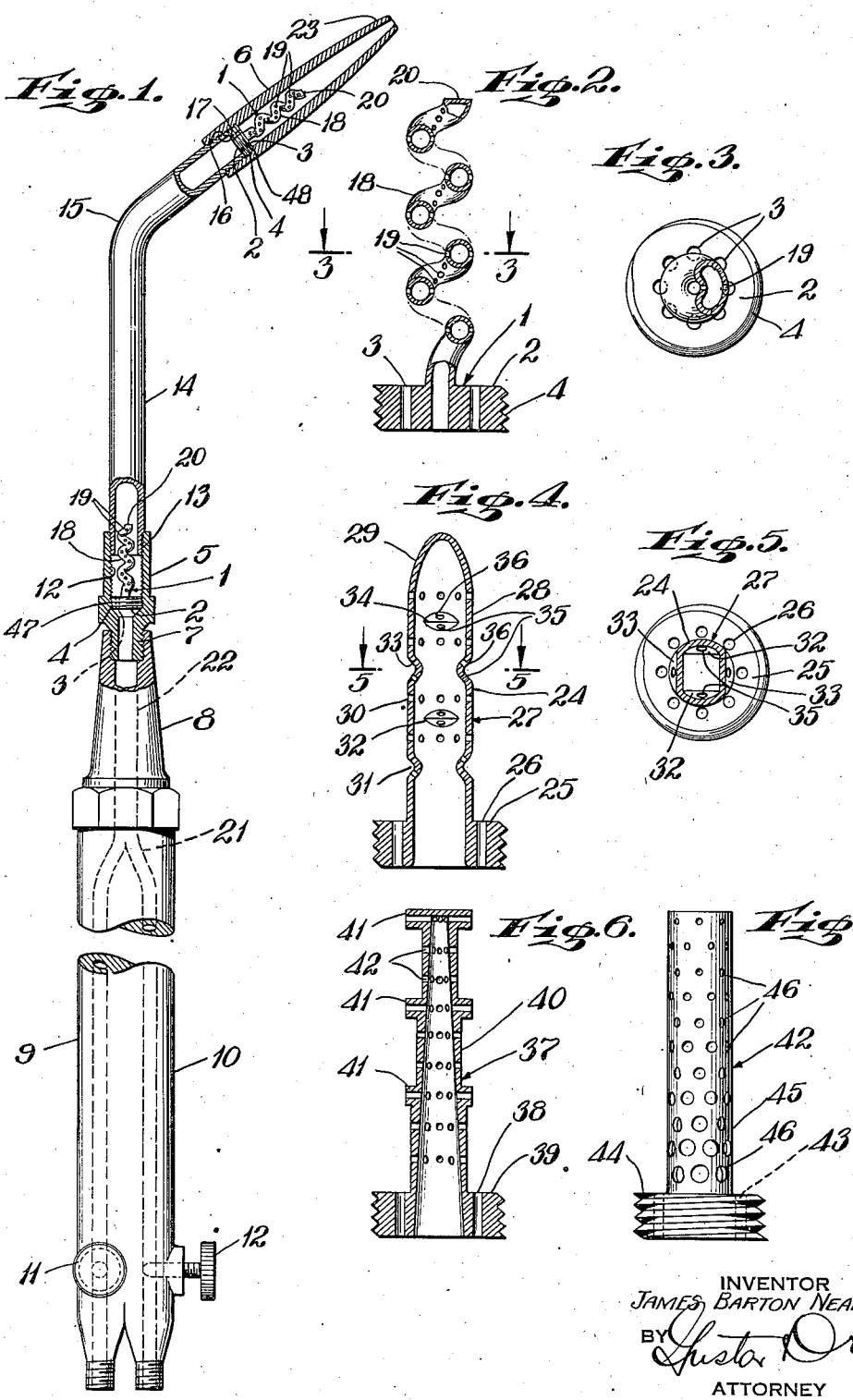
INVENTOR
JAMES BARTON NEALEY
BY
ATTORNEY Patented May 19, 1942

2,283,567

UNITED STATES PATENT OFFICE 2,283,567

WELDING TORCH

James Barton Nealey, Wilton, Conn.

Application June 25, 1940, Serial No. 342,256

4 Claims. (Cl. 158—27.4)

The present invention relates generally to welding torches and the like for welding, brazing and cutting metals by the application of intense heat commonly obtained by the combustion of mixed gases, usually a combustible gas and a combustion supporting gas, under high or low pressure.

In the commercial use of gas heretofore, inexpensive gases of low calorific value are readily available in practically all communities and are piped directly to the shop and factory thereby eliminating the necessity for expensive cylinders, tanks, generators and the like. Much time and money has been spent in an endeavor to design torches and techniques whereby these economical gases can be successfully employed in welding, brazing, cutting and the like. These efforts to date have met with little success.

Failures are directly traceable to low flame intensities, slow welding speeds, and, in the case of steel, due to oxidation or carburization resulting in weak welds. Every metal has a definite chemical combination and again each chemical combination has certain grain structures which control directly the strength, hardness, ductility, and the like of the metal. These grain structures are very sensitive to heat and especially to the higher temperatures and their reformation through heating and cooling in some cases entirely changes the physical characteristics of the original metal. For instance, a soft steel or alloy may be made hard, a weak steel or alloy may be made stronger, and vice versa, according to how the heating and cooling are controlled. For strong welds, it has been found that fast welding with controlled atmospheres surrounding the welding zone are the first requisites.

The leading characteristic of the oxygen-acetylene process is the use of the one to one mixture of the two gases, although theoretically two and one-half times as much oxygen as acetylene is required to produce complete combustion. In actual practice there results a two or more zone flame which is easily recognizable. An intensely hot luminous cone in the center results from the better combustion at the center of the one to one mixture, and this cone is surrounded by an envelope of imperfect combustion containing some unburned gas and some products of combustion, such as carbon monoxide and hydrogen. The latter in turn are consumed, at a less rapid rate, by drawing oxygen from the air. This outer envelope protects the metal from oxidation provided the welding is carried on at a sufficiently high rate of speed and a so-called "neutral" flame is maintained. Of course, this central luminous cone can be made reducing (carburizing), oxidizing or neutral at the will of the operator and he must nicely regulate the volumes and pressures to produce the result desired.

On the other hand, the use of low B. t. u. gases, which are already partially oxidized, present a difficult and heretofore almost insurmountable problem. While acetylene and like gases have enough excess B. t. u.'s to produce an intensely hot flame with partial combustion, city gas of low B. t. u. content must be differently employed to achieve the same end. The rate of flame propagation (gaseous combustion) must be accelerated in order to increase the flame intensity and flame temperature. This is accomplished in part by more intimately mixing or commingling the combustible gas with the combustion supporting gas.

In view of the foregoing, the present invention has to do with the provision of improved welding torches and the like, including mixing devices or mixers for economically and effectively employing cheap city gas, natural gas and other gases of low calorific value as the combustible gas.

In view of the foregoing, it is also an object of the present invention to provide an improved welding torch in which there can successfully be employed cheap and economic gases of low B. t. u. content such as manufactured, natural and mixed gases, known as city gas, also butane, methane and the like.

In view of the foregoing, it is also an object to provide an improved welding torch and mixer by means of which the rate of flame propagation (gaseous combustion) is accelerated and the flame intensity increased to effect a hotter flame.

The present invention also aims to provide an improved means by which the danger of flashback or backfire which may lead to explosion is mitigated, if not eliminated.

It is still another object of the present invention to provide an improved mixer with a view to effecting an intimate mixture of the combustible gas and combustion supporting gas, resulting in turn in a saving in oxygen, when oxygen is used as the combustion supporting gas, since the better the mixture, the less the oxygen required for a given efficiency in combustion.

It is still another object of the present invention to provide an improved mixer for a welding torch with a view to effecting a better mixture, and in turn to maintain a comparatively cool burner tip during use.

A still further object of the present invention is the provision of an improved holder and mixer in which the mixer can be readily inserted at a point between the handle and burner tip and in which the tip can readily be replaced, in the interest of flexibility as the variation in work requires, with the least possible hindrance or loss of time.

These and other features, capabilities and advantages of the invention will appear from the sub-joined detail description of specific embodiments thereof illustrated in the accompanying drawing in which Figure 1 is a side elevation partly in section of a welding torch made according to the present invention;

Fig. 2 is a longitudinal section of one of the mixing devices shown in Fig. 1;

Fig. 3 is a section on the line 3—3 of Fig. 2;

Fig. 4 is a longitudinal section of another type of mixing device than that shown in Fig. 2;

Fig. 5 is a transverse section on the line 5—5 of Fig. 4;

Fig. 6 is a longitudinal section of still another type of mixing device than that shown in Fig. 2; and Fig. 7 is a side elevation of still another type of mixing device than that shown in Fig. 2.

Roughly, the principal parts of the ordinary welding torch include a mixing device and welding tip with two tubes for the gases leading into the mixer and a single tube from the mixer to the tip. These torches are unsuited for welding with gases of low calorific value such as city gas because their mixture with a combustion supporting gas such as oxygen is incomplete, the tips inadequate and the volume proportions incorrect. While means readily present themselves for the correction of the latter two difficulties, my invention is directed mainly to means for the more complete mixing of the two gases. The ignition velocity of gaseous combustion is directly influenced by the fact that two gases of varying specific gravity, flowing side by side, free or through a tube, tend to maintain parallel and separate streams. To cause them to commingle a mixing device must be interposed. In ordinary welding torches, a mixing device of sorts is employed and with acetylene and like gases it is adequate and sufficient. With city gas, however, better means for providing a more intimate mix must be provided. Furthermore, provision must be made for the passage of a preponderance of the combustible gas, the one to one proportion being inadequate, so that the proper atmosphere can be maintained in the outer envelope of the flame surrounding the inner luminous cone.

The present invention in part consists of one or more mixing devices inserted in a welding torch and located preferably in the gooseneck or burner tip or both. The mixer produced by these mixing devices breaks up the gas stream by putting into effect and combining the well known principles of mixing gases by changes of direction, changes in velocity, differential velocities, baffling turbulence, torsional interruptance, setting up pressure oscillations, eddy currents, jet interference, and the like. It consists of a perforated spiral tube or tubes, fixed to and extending from a perforated base plate so that straight streams of gas meet torsionally interrupting streams of gas and jets of gas shooting in every direction at different velocities. One or more spiral tubes may be used or combined with a straight tube or tubes, all perforated. The spiral tube may be wound on a perforated cone or one with angled slots. Another embodiment combines a perforated cone with concave or flat baffles, which may be straight or spiral and which may be solid or perforated or contain holes drilled from the periphery of the baffle to the interior of the cone.

In the embodiment shown in Figs. 1, 2 and 3, there is illustrated a mixer 1 including a base plate 2 having perforations 3 therein and externally threaded as at 4 to be screw-threadedly secured either inside a holder such as the holder 5 remote from a burner tip, such as the burner tip 6, or inside a burner tip such as the burner tip 6.

The holder 5 in the present instance includes an externally threaded extension 7 screw-threadedly secured to the inside of the connection 8 formed at the end of the two communicating conduits 9 and 10 provided with the control valves 11 and 12 respectively, the conduit 9 being intended in the present instance to be connected to a supply of oxygen or the like, combustion supporting gas, and the conduit 10 being connected to a supply of combustible gas such as manufactured, natural and mixed gases known as city gas, or such as butane, methane and the like.

The holder 5 is internally screw-threaded as at 12 to conform to the thread 4 of the mixing device 1 and also to the thread 13 of the intermediate connecting conduit 14. The conduit 14 according to the usual practice, is generally bent at 15 and provided with an external screw thread 16 at its outer end corresponding to the size and pitch of the thread 4 of the mixing device 1 so that both may be screw threadedly connected to the thread 17 of the burner tip 6.

The mixing device which in the present embodiment is provided with a spiral tube portion 18, has perforations 19 throughout the length thereof and is closed at its outer end 20 as shown in Fig. 2.

With the embodiment shown in Figs. 1, 2 and 3, it will first be noted that the oxygen entering via the conduit 9 and the combustible gas entering via the conduit 10, will initially meet at 21, where the bores of the conduits 9 and 10 merge into the common passage 22 effecting an initial mixture. Thereupon the so intermixed oxygen and combustible gas will proceed until they arrive at the first mixing device 1 in the holder 5. Here, parts of the mixture will proceed through the openings 3 in the base plate 2 of the mixer 1 in substantially parallel lines axially with the holder 5, and another part will enter the spiral tube portion 18 and issue therefrom in every conceivable direction, forming jets that will not only effectively impinge upon one another, but also upon the jets proceeding through the openings 3. Thereupon, the mixture will continue through the connection 14 to the mixer 1 in the burner tip 6 and again be subjected to the mixing action described with regard to the mixer 1 in the holder 5 and finally discharged through the burner tip 6.

While the mixer 1 in the holder 5 may in some instances be omitted, it is considered important for most uses to provide a mixer 1 in the burner tip 6 since it has been found that the best results are produced when the final mixing takes place close to the initial point of combustion, that is, adjacent to the nose 23 of the burner tip 6 because gases of different specific gravity, regardless of how well mixed, tend to separate if allowed to travel uninterrupted through any appreciable distance. On account of the latter tendency, furthermore, it is also desirable in the interest of the best results, to interpose a number of mixers 1 between the initial merger of the gases as at 21 and the burner tip 6, so that this stratification of the gases into separate homogeneous streams may be positively prevented.

The movement imparted to the mixture by the mixer 1 is characterized not only by the different directions that the several jets will assume as they issue from the different openings, in the spiral tube portion 18 and in the base plate 2, but also by various velocities, pressure oscillations, eddy currents and the like effectively to break up any stratification of the gases. The latter characteristics are brought about in part by the differences in the diameters of the openings 3 in the base plate 2 as compared to the diameter of the passage through the spiral tube portion 18; the different directions imparted to the gas streams as they issue from the spiral tube portion 18 and openings 3, the direction of gas streams in some instances actually being reverse to the direction of other gas streams issuing from the spiral tube portion 18 and openings 3; and the baffling action imparted to the streams as they issue from the spiral tube portion 18 in part due to the impingement of the streams upon one another and also due to the impingement of some of the streams upon the elbows or bends of the spiral tube portion 18 itself and upon the inner cylindrical face of the surrounding wall, as an instance, the inner wall of the holder 5 in one case, and the inner wall of the burner tip 6, in another case.

The mixing unit 24 shown in Figs. 4 and 5 is similar to the mixing units of Figs. 2 and 3 in that it is provided with a base plate 25 provided with orifices 26 and has the tubular extension 27 associated therewith, but departs from the embodiment of Figs. 2 and 3 in that the bore of the tubular extension 27 has a much greater diameter than that of the orifices 26, and in that the tubular extension 27 here partakes of a different form. The form of the extension 27 is characterized by a substantially cylindrical wall member 28 terminating in a tapered end 29 with small openings 30 therein, in diameter even smaller than those of the openings 26; and also characterized by indentations 31, 32, 33 and 34, the indentations 31 and 33 as an instance facing east and west, as distinguished from the indentations 32 and 34 facing north and south and at right angles to the indentations 31 and 33. These indentations each have two small openings 35 and 36 cooperating with the walls in which they are positioned to cause streams or jets to move at right angles to one another.

The mixing unit 37 shown in Fig. 6 resembles the mixing unit 24 shown in Fig. 4 in the formation of the openings 38 in the base plate 39, but departs therefrom in the construction and form of the tubular extension 40 which is slightly tapering and provided with baffles 41 in the form of annuli extending at right angles to the axis of the tubular extension 40, and with openings 42 in the tapered tubular extension 40, and other openings 42 extending through the annuli 41 at right angles to the axis of the tubular extension 40.

The mixing unit 42 shown in Fig. 7 resembles the mixing unit 37 shown in Fig. 6 in the formation of the openings 43 in the base plate 44 but differs therefrom in the formation and construction of the tubular extension 45, which while having a bore much greater in diameter than that of the openings 43, is substantially cylindrical in construction and provided with openings 46 at successive levels which diminish in diameter as they aproach the upper closed end of the tubular extension 45.

In Fig. 1 the external screw threads 16 and 13 of the tubular connection 14 have the same diameter and pitch and are identical to the diameter and pitch of the screw threads 4 of the base plates 2 of the mixing units 1. Consequently, the internal screw threads 12 of the holder 5 and the internal screw threads 17 of the burner tip 6 have the same diameter and pitch. It will also be noted that at the inner end of the internally threaded portion 12 of the tubular holder 5 there is formed a shoulder 47 to determine the position of the base plate 2 of the mixing unit 1 and that the tubular connection 14 when connected to the tubular holder 5 effectively cooperates with the holder 5 effectively to enclose the mixing unit 1 against injury and tampering. It would also be noted that at the inner end of the screw threads 17 of the burner tip 6, there is formed a shoulder 48 which determines the position of the base plate 2 of the mixing unit 1 in the burner tip 6 and that here, too, the tubular connection 14 when secured to the burner tip 6 cooperates with the burner tip 6 effectively to house the mixing unit 1 and protect it against tampering.

The flexibility afforded by this arrangement has decided advantages. As an instance, the location of the gooseneck or curve 15 with respect to the end 23 of the burner tip 6, can thus be changed at will, in the first place, in that the tubular connection 14 may be reversed and have the long arm to the one side of the curve 15 adjacent the burner tip 6 instead of adjacent to the holder 5 as illustrated. On the other hand, the welder may be provided with a number of different lengths and shapes of tubular extensions 14 so that the welder can select the tubular connection 14 particularly suited for the job at which he may be working. In the next place, the mixing units may become clogged up during use and require replacement. The present arrangement, therefore, has a decided advantage in that the welder is required to be supplied with only one size of mixing unit 1 to replace either the mixing unit in the holder 5 or in the burner tip 6. In the next place, since the mixing unit 1 in the holder 5 may sometimes be dispensed with, if the supply of mixing units should run down, in an extremity, the welder could replace the mixing unit in the burner tip 6 with the mixing unit in the holder 5.

With this improved mixer, it has been found that the pressure of the gases may be increased, thereby accelerating the rate of flame propagation and the flame intensity, in turn to effect a hotter flame without endangering the flame at the tip of the burner, that is, without blowing the flame off the tip.

It is obvious that various changes and modifications may be made to the details of construction without departing from the general spirit of the invention as set forth in the appended claims.

I claim:

1. A secondary mixing unit for use in the conduit of a torch or the like comprising a perforated base plate having a central opening and a central perforated extension closed at one end and extending from the base plate in the direction of the flow of a combustible mixture of previously mixed gases so that the mixture passing through the mixing unit will be caused to pass through the perforations in the base plate and central extension and impinge upon one another, the perforations formed in the base plate being larger in diameter than those formed in the extension but less in number so that the volume of the mixture passing through the base plate will approximate the volume of the mixture passing through the extension, and means on the base plate for securing the same to the conduit of the torch, the central extension being cylindrical in form with depressions in the side walls thereof and spaced axially along its length and circumferentially of said walls, with the perforations not only in the cylindrical undepressed portion of the extension but also in the depressed portions of the extension, the streams of the mixture issuing from the perforations in the base plate forming a virtual cylindrical wall of mixed gases, and the streams of the mixture issuing from the perforations in the central extension intersecting the cylindrical wall of the mixture at different angles, the perforations in the depressions inclining downwardly as well as upwardly relative to the orifices in the base plate so that the mixture jets issuing therefrom may be directed not only in a direction opposed to the direction of the mixture issuing from the perforations in the base plate but also in an opposite inclined direction.

2. A one piece mixing unit for the conduit of a torch or the like comprising a perforated base plate having a central opening and a central perforated extension closed at one end and extending from the base plate in the direction of the flow of a combustible mixture of commingled gases so that the mixture passing through the mixing unit will be caused to pass through the perforations in the base plate and central extension and impinge upon one another, the perforations formed in the base plate being larger in diameter than those formed in the extension but less in number so that the volume of the mixture passing through the base plate will approximate the volume of the mixture passing through the extension, and means on the base plate for securing the same to the conduit of the torch.

3. A mixing unit for the conduit of a torch or the like comprising a perforated base plate having a central opening and a central perforated extension closed at one end and extending from the base plate in the direction of the flow of a combustible mixture of commingled gases so that the mixture passing through the mixing unit will be caused to pass through the perforations in the base plate and central extension and impinge upon one another, the perforations formed in the base plate being larger in diameter than those formed in the extension but less in number so that the volume of the mixture passing through the base plate will approximate the volume of the mixture passing through the extension, and means on the base plate for securing the same to the conduit of the torch, the central extension being cylindrical in form with depressions in the side walls thereof and spaced axially along its length and circumferentially of said walls, with the perforations not only in the cylindrical undepressed portion of the extension but also in the depressed portions of the extension, the streams of the mixture issuing from the perforations in the base plate forming a virtual cylindrical wall of mixed gases, and the streams of the mixture issuing from the perforations in the central extension intersecting the cylindrical wall of mixed gases at different angles.

4. A one piece mixing unit for the conduit of a torch or the like comprising a perforated base plate having a central opening and a central perforated extension closed at one end and extending from the base plate in the direction of the flow of a combustible mixture of commingled gases so that the mixture passing through the mixing unit will be caused to pass through the perforations in the base plate and central extension and impinge upon one another, the perforations in the extension being spaced axially along its length and being greater in number than those in the base plate but smaller in diameter so that the volume of the mixture passing through the base plate will approximate that passing through the perforations in the extension, the base plate being secured at its periphery to the inner cylindrical face of the conduit of the torch.

JAMES BARTON NEALEY.